United States Patent
Li et al.

(10) Patent No.: US 7,097,753 B2
(45) Date of Patent: Aug. 29, 2006

(54) DILUTE SUPPORT FRAME FOR AN EDI DEVICE

(75) Inventors: Xiang Li, Huzhou Zhejiang Province (CN); Gou-Lin Luo, Huzhou Zhejiang Province (CN)

(73) Assignee: Zhejiang Omex Environmental Engineering Ltd., Huzhou (CH)

( * ) Notice: Subject to any disclaimer, the term of this patent is extended or adjusted under 35 U.S.C. 154(b) by 357 days.

(21) Appl. No.: 10/630,338

(22) Filed: Jul. 30, 2003

(65) Prior Publication Data

US 2004/0154916 A1 Aug. 12, 2004

Related U.S. Application Data

(60) Provisional application No. 60/445,490, filed on Feb. 6, 2003.

(51) Int. Cl.
*B01D 61/46* (2006.01)

(52) U.S. Cl. ............... 204/632; 204/633; 204/636; 204/638; 204/639

(58) Field of Classification Search ............... 204/636, 204/638, 639
See application file for complete search history.

(56) References Cited

U.S. PATENT DOCUMENTS

| | | | |
|---|---|---|---|
| 2,689,826 A | 9/1954 | Kollsman | |
| 2,815,320 A | 12/1957 | Kollsman | |
| 3,985,636 A * | 10/1976 | Schneider | 204/630 |
| 4,062,756 A * | 12/1977 | Jha et al. | 204/639 |
| 4,225,413 A | 9/1980 | Karn | |
| 4,437,967 A * | 3/1984 | Sanchez et al. | 204/639 |
| 4,752,373 A * | 6/1988 | Korngold | 204/638 |
| 4,753,681 A | 6/1988 | Giuffrida et al. | |
| 4,925,541 A | 5/1990 | Giuffrida et al. | |
| 4,931,160 A | 6/1990 | Giuffrida | |
| 5,147,722 A | 9/1992 | Koslow | |
| 5,259,936 A | 11/1993 | Ganzi | |
| 5,292,422 A | 3/1994 | Liang et al. | |
| 5,308,466 A | 5/1994 | Ganzi et al. | |
| 5,316,637 A | 5/1994 | Ganzi et al. | |
| 5,376,253 A | 12/1994 | Rychen et al. | |
| 5,425,858 A | 6/1995 | Farmer | |
| 5,858,191 A | 1/1999 | DiMascio et al. | |

(Continued)

FOREIGN PATENT DOCUMENTS

EP 0 384 716 A2 8/1990

(Continued)

OTHER PUBLICATIONS

How the Omexell 210 Module Works—2 pgs, no date.

(Continued)

*Primary Examiner*—Roy King
*Assistant Examiner*—William T. Leader
(74) *Attorney, Agent, or Firm*—Butzel Long

(57) ABSTRACT

The dilute support frame is made up of interphase longitude and latitude bars that preferably are hollow. The bars can be rectangular, rectangular with a rounded end, half-circular, triangular, polygonal or any combination thereof. The bars are sized to support the ion exchange resin in the dilute channel adjacent the concentrate membrane bag. The support frame also assures fluent water flow in the dilute channel. The support frames are arrayed on the membranes with interphase aisle to save the frame arrays and make water flow fluently. The membrane envelopes in turn with the support frames as both are preferably wound to form the cylinder module, and is covered by one plastic protecting net. This new type of support frame can assure fluent water flow in dilute channels and convenient resin filling.

16 Claims, 2 Drawing Sheets

U.S. PATENT DOCUMENTS

| | | |
|---|---|---|
| 5,868,915 A | 2/1999 | Ganzi et al. |
| 5,925,255 A | 7/1999 | Mukhopadhyay |
| 5,954,937 A | 9/1999 | Farmer |
| 6,190,528 B1 | 2/2001 | Li et al. |
| 6,193,869 B1 | 2/2001 | Towe et al. |
| 6,284,117 B1 | 9/2001 | Smolko et al. |
| 6,284,124 B1 | 9/2001 | DiMascio et al. |
| 6,309,532 B1 | 10/2001 | Tran et al. |
| 6,312,577 B1 | 11/2001 | Ganzi et al. |
| 6,328,896 B1 | 12/2001 | Atnoor et al. |
| 6,344,122 B1 * | 2/2002 | Deguchi et al. ............ 204/632 |
| 6,398,965 B1 | 6/2002 | Arba et al. |
| 6,436,264 B1 | 8/2002 | Tamura |
| 2002/0011413 A1 | 1/2002 | DiMascio et al. |

FOREIGN PATENT DOCUMENTS

| | | |
|---|---|---|
| EP | 0 660 747 B1 | 7/1995 |
| WO | WO 94/06548 | 3/1994 |
| WO | WO 95/32803 | 12/1995 |
| WO | WO 97/28889 | 8/1997 |
| WO | WO 98/11987 | 3/1998 |
| WO | WO 98/20972 | 5/1998 |
| WO | WO 99/50184 | 10/1999 |
| WO | WO 00/44477 | 8/2000 |
| WO | WO 02/14224 A1 | 2/2002 |

OTHER PUBLICATIONS

The New Leader in EDI—Omexell 210 Module—2 pgs, no date.

The New Leader in EDI—Omexell System—2 pgs, no date.

An Introduction to Spiral Wound EDI, Water Technology—4 pgs. (Jan. 2003).

* cited by examiner

DILUTE SUPPORT FRAME FOR AN EDI DEVICE

This application is a non-provisional application of U.S. provisional application No. 60/445,490, filed on Feb. 6, 2003.

FIELD OF THE INVENTION

This invention relates to the field of Electrodeionization (EDI) devices. In particular, this invention relates to supporting contents used in an EDI module.

BACKGROUND OF THE INVENTION

Pure water treatment equipment is necessary in water treatment processes used in power plants and electronic industrial plants. In traditional industrial pure water treatment technologies, Electrodialysis and ion exchange technologies are combined to develop products and methods for getting ultra pure water. For example, Chinese Patent No. 96244875.4 shows one type of treatment equipment. Resins are filled in normal electrodialysis dilute chamber and Anode and Cathode electrodes are placed outside the module. The advantage of this approach is that it has the same distance between every two membranes and reliably stable resistivity so that the current intensity is relatively easy to control. The disadvantage of this approach is that it is difficult to fill the chambers with resin. In fact, special ion fiber knitting is used to help alleviate the problem.

To further resolve this disadvantage, some EDI modules are formed having a wound cylinder structure. Chinese Patent No. 00220610.2 entitled "Polyhedron Wound EDI" shows this kind of treatment equipment. In the polyhedron wound EDI, Anionic/Cationic membranes/isolation support frames form a special dilute chamber and concentrate envelop chamber which connect to the dilute/concentrate collecting pipes. The dilute envelope chamber is filled with resins, and Anode/Cathode electrodes are set up. The improvement of Chinese Patent No. 00220610.2 is that the ion membranes/support frames are polyhedron. The dilute water comes from multi-connected rectangle chambers. This patent partly resolves some issues of resin filling for resins not limited in ion fiber knitting. However, the support frame has its disadvantages. Water can not flow easily in the dilute chamber, so resins cannot be conveniently filled.

U.S. Pat. No. 6,190,528, issued Feb. 20, 2001 to Xiang Li et al. discloses a helical EDI apparatus. However, the Xiang Li patent does not disclose a dilute support frame. U.S. Pat. No. 6,190,528 is incorporated by reference herein in its entirety.

SUMMARY OF THE INVENTION

In accordance with the preferred embodiments of the invention, a new EDI module includes material having multiple holes for water distributing and water collection. In accordance with a preferred embodiment, an electrodeionization (EDI) device includes an anion exchange membrane, a cation exchange membrane, a first electrode, at least one membrane bag formed by the anion exchange membrane and the cation exchange membrane, and a second electrode. The membrane bag also includes a concentrate flow channel. A dilute water flow channel is located adjacent to the at least one membrane bag. The dilute water flow channel includes an integrated frame having an array of bars spaced apart. The frame is arranged to support the dilute water flow channel and allow dilute water to flow fluently therethrough. A housing contains the foregoing components.

Further scope of applicability of the present invention will become apparent from the description given hereinafter. However, it should be understood that the detailed description and specific examples, while indicating preferred embodiments of the invention, are given by way of illustration only, since the invention will become apparent to those skilled in the art from this detailed description.

BRIEF DESCRIPTION OF THE DRAWINGS

The invention will be described in conjunction with the following drawings in which like referenced numerals designate like elements and wherein.

DETAILED DESCRIPTION OF THE INVENTION

Figure 1:
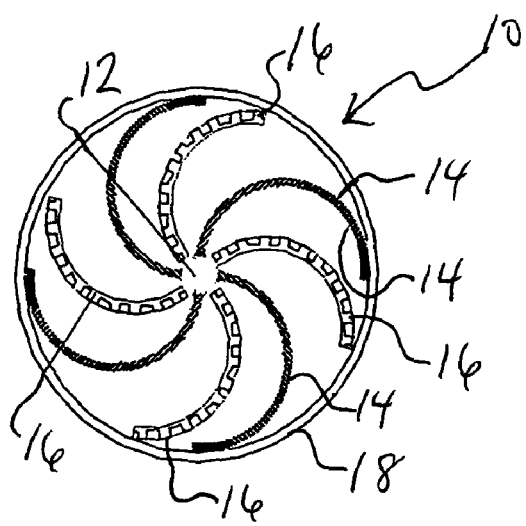
FIG. 1 is a sectional view of an EDI module including a dilute support frame in accordance with a preferred embodiment of the present invention.

The dilute support frame described herein solves the problems associated with the prior art by incorporating an improved dilute support frame for an EDI device that makes water flow easily in dilute channels (e.g., chambers) and allows for convenient resin refill. While not being limited to a particular theory, in accordance with a preferred embodiment of the present application, a dilute support frame is made up of interphase longitudes and hollow latitudes. The integrated support frames are arrayed on the membranes of wound EDI modules with interphase aisles. The membrane envelopes in turn with the support frames and are wound to form the cylinder module that is covered by a plastic protecting net.

The support frame is described in combination with an EDI device that is spiral wound or helical. It is understood that the support frame can also be used with other types of EDI devices, including stacked EDI devices. Accordingly, the scope of the invention is not limited to spiral wound EDI devices, but includes various other types of EDI devices, as readily understood by a skilled artisan.

The most preferred support frame is optimized so that the angle between the longitudinal direction of the support frame and the axial direction of the concentrate center pipe (or the axial direction of the EDI device) is about 0 degrees to 60 degrees. The height along its longitude is preferably about 3.0 mm to 8.0 mm, and the thickness along its latitude is preferably about 0.4 mm–2.0 mm. While not being limited to a particular theory, the size and width of the hollows and bars should preferably be about the same for assuring smooth and easy water flow with sufficient intensity. Moreover, the preferred integrated support frames are wound on or in the membranes of the EDI device with an interphase aisle structure to save the frame arrays and make water flow fluently.

A side view of the support frame shows the shape of each bar as rectangular. It is understood that the shape can vary within the scope of the invention to include other shapes such as rectangle with an arced terminal, semispherical, triangular, polygonal or any combination thereof.

The dilute support frame has a simple configuration and reasonable lay-out to make the water flow fluently in dilute channels and resin fill convenient. In addition, the support frame is economical, and easy to make and use.

The present invention is directed to a support frame preferably located in an EDI device. An exemplary spiral wound EDI device or module 10 having such a support frame is shown in FIG. 1.

As shown, the EDI module includes a conduit 12, anion and cation membranes 14, a dilute support frame 16 and a plastic protecting net 18. The membranes 14 are similar to reverse osmosis membranes.

As shown in FIG. 1, the membranes 14 and support frame 16 are wound (e.g., rolled) around the conduit 12 to form a cylindrical element. Adhesives (e.g., glue) are used to seal the membranes 14, support frames 16 and conduit 12 together to form a replaceable spiral wound membrane element. The element is preferably covered by the plastic protecting net 18 and is then placed into a supportive housing (e.g. a fiberglass pressure vessel).

The dilute support frame forms a dilute chamber that is filled with resin. The unit is sealed inside the housing. While not being limited to a particular theory, the conduit is preferably an axially located stainless steel pipe that acts as both the concentrate distributor/collector and the cathode. A titanium or other electrically conductive material layer lines the inside of the housing, which is preferably a fiberglass pressure vessel, and becomes the anode.

Without being limited to a particular theory, the housing is preferably a fiberglass pressure vessel. It is understood that the vessel can be of any material that enables the vessel to hold the membrane element. Such materials include conductive materials such as stainless steel with a non-conductive lining. The vessel or housing may or may not contain an outer electrode, depending on the interest of the user. The placement of an outer electrode is not considered critical to the crux of the invention.

Figure 2:
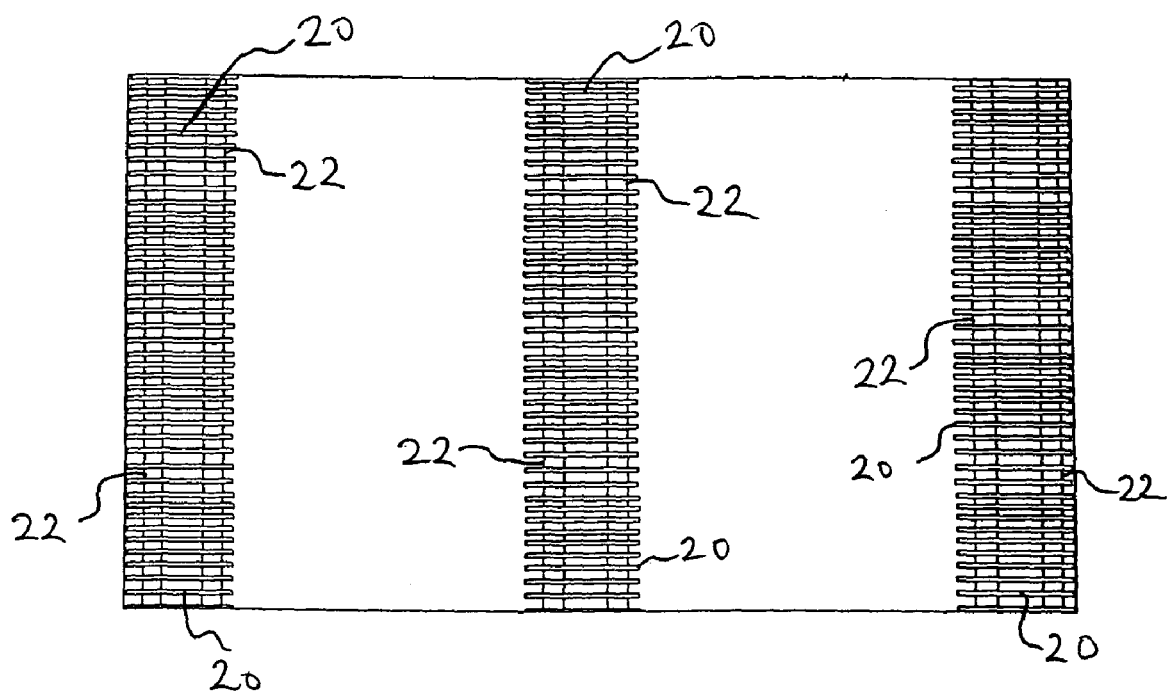
FIG. 2 is a side view of the support frame shown in FIG. 1.
Figure 3:
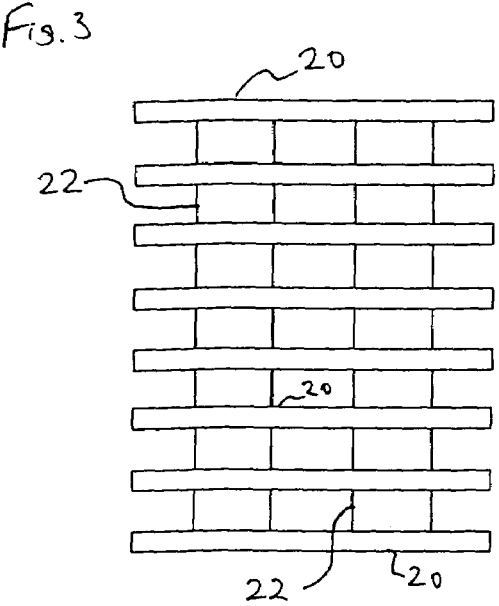
FIG. 3 is a partial side view of the support frame shown in FIG. 2.
Figure 4:
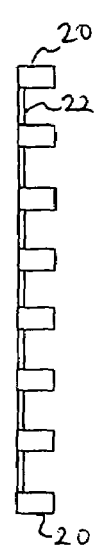
FIG. 4 is a sectional view of the support frame shown in FIG. 3.
Figure 5:
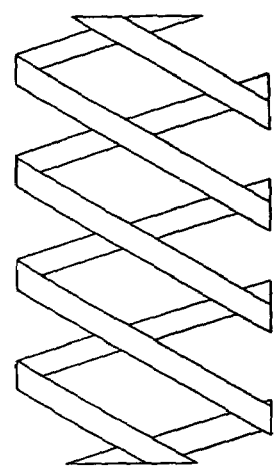
FIG. 5 is a partial side view of a dilute support frame in accordance with another preferred embodiment of the invention.
Figure 6:
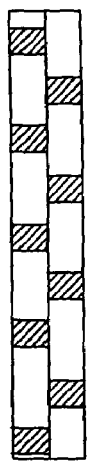
FIG. 6 is a sectional view of the support frame shown in FIG. 5.

The support frame of wound EDI module is set between the concentrate axial conduit 12 and the plastic protecting net 18. As can best be seen in FIGS. 2–4, the frame is made of interphase longitude bars 20 and latitude bars 22 with hollow sections between the bars. As shown in FIG. 4, the interphase longitude bars 20 are shown in side view as generally rectangular.

The cross sectional shape of the bars is not limited to a rectangular shape, as the shape of the bars can be any shape that holds resin in place in the dilute channels while providing support to the spiral EDI module. Acceptable shapes of the bars include but are not limited to rectangular, square, circular, rectangular with curved edges, semi-circular, triangular, another polygonal shape or any combination thereof.

The preferred angle between the longitude bar 20 direction of the support frame and the axial direction of the concentrate center conduit 12 (or the axial direction of the EDI device) is about 0° to 60°. The preferred height of the longitude bars is about 3.0–8.0 mm, and the preferred thickness of the latitude bars is about 0.4 mm–2.0 mm. The size and width of the bars, as well as the spacing between adjacent bars should be consistent for assuring fluent water flow through the dilute chamber with sufficient flow for optimal performance by the EDI device. The integrated support frames of the spiral wound EDI module 10 are arrayed on the membranes 14 with interphase aisles to support the module 10 and allow water to flow fluently. The membranes 14 envelope in turn with the support frames 16, and are wound around the central axial conduit 12 to form the cylinder module, which is then covered by a plastic protecting net 18.

FIGS. 3–4 and 5–6 show alternative griddle configurations for allowing water to flow fluently in the dilute channels and to permit convenient resins filling. In the configurations shown in FIGS. 5 and 6, the bars are shown at angles rotated from the axial direction of the center conduit 12 upon assembly in the cylinder module.

It should be apparent from the aforementioned description and attached drawings that the concept of the present invention may be readily applied to a variety of preferred embodiments, including those disclosed herein. For example, as previously noted, while the support frame is described in accordance with a preferred embodiment for a helical EDI device, it is understood that the frame is applicable to other types of EDI devices, including stacked EDI devices, in accordance with other preferred embodiments. Without further elaboration, the foregoing will so fully illustrate the invention that others may, by applying current or future knowledge, readily adapt the same for use under various conditions of service.

What is claimed is:

1. A helical electrodeionization device that is spirally wound to have a helical configuration, which helical electrodeionization device comprises;
    an axially extending conduit generally located along a central axis of the helical electrodeionization device;
    a first electrode;
    at least one membrane bag formed from an anion exchange membrane and a cation exchange membrane;
    a second electrode;
    said at least one membrane bag having a concentrate flow channel and a dilute flow channel located adjacent said at least one membrane bag, said at least one membrane bag and said diluent flow channel being wound about said axially extending conduit and said dilute flow channel being: i) positioned between layers of said at least one wound membrane bag, ii) filled with an ion exchange resin, iii) comprising at least two integrated support frames each of which includes an array of bars that are spaced apart, and iv) made up of interphase longitudes and hollow latitudes; and
    a housing for housing the foregoing components,
    wherein said at least two support frames are wound on or in said membranes and spaced apart so as to define an interphase aisle structure between adjacent pairs of the at least two support frames.

2. The device of claim 1, wherein a longitudinal direction of the at least two integrated support frames is rotationally offset from an axial direction of the electrodeionization device at an angle of about zero to sixty degrees.

3. The device of claim 1, wherein the array of bars of each of said at least two support frames includes longitudinal bars that are spaced apart from one another at a distance of between about 3 mm and 8 mm.

4. The device of claim 1, wherein the array of bars of each of said at least two support frames includes latitudinal bars that have a thickness of about 0.4 mm and 2.0 mm.

5. The device of claim 1, wherein the array of bars of each of said integrated support frames comprise bars provided on the adjacent anion exchange membrane and cation exchange membrane.

6. The device of claim 1, wherein the bars of the at least two support frames are rectangular in cross section.

7. The device of claim 1, wherein the bars of the at least two support frames are rectangular with rounded edges in cross section.

8. The device of claim 1, wherein the bars of the at least two support frames are polygonal in cross section.

9. The device of claim 1, wherein the bars of the at least two support frames are semi-circular in cross section.

10. The device of claim 1, wherein the bars of the at least two support frames are triangular in cross section.

11. The device of claim 1, wherein the bars of the at least two support frames are substantially in a parallel relationship with each other.

12. The device of claim 1, wherein each of said integrated support frames is wound about said axially extending conduit together with said at least one membrane bag.

13. The device of claim 1, wherein said second electrode is a metal member extending about an outside portion of said at least one membrane bag.

14. The device of claim 1, wherein said axially extending conduit comprises a pipe having slotted apertures arranged to communicate fluid with said concentrate flow channel.

15. The device of claim 1, wherein said axially extending conduit includes said first electrode.

16. The device of claim 1, wherein each of said at least two support frames are arranged to provide spatial and structural support to the anion and cation membranes which define the diluent flow channel.

* * * * *